United States Patent [19]

Kaganowicz et al.

[11] 4,137,550
[45] Jan. 30, 1979

[54] VIDEO DISC WITH A DIELECTRIC LAYER FORMED FROM ACETYLENE AND NITROGEN

[75] Inventors: Grzegorz Kaganowicz, Princeton, N.J.; John W. Robinson, Levittown, Pa.; Hirotsugu Yasuda, Durham, N.C.

[73] Assignee: RCA Corporation, New York, N.Y.

[21] Appl. No.: 852,928

[22] Filed: Nov. 18, 1977

[51] Int. Cl.$^2$ .................... H04N 1/28; B32B 3/02
[52] U.S. Cl. .................... 358/128; 179/100.1 B;
428/64; 428/65; 428/461; 428/626; 428/675
[58] Field of Search ............ 428/64, 65, 461, 626,
428/675; 358/128; 179/100.1 B

[56] References Cited

U.S. PATENT DOCUMENTS

| | | |
|---|---|---|
| 3,466,156 | 9/1969 | Peters .................... 428/65 |
| 3,833,408 | 9/1974 | Matthies .................... 358/128 |
| 3,842,194 | 10/1974 | Clemens .................... 179/100.1 B |
| 3,843,499 | 10/1974 | Kaplan .................... 358/128 |
| 3,901,994 | 8/1975 | Mehalso .................... 179/100.1 B |
| 3,982,066 | 9/1976 | Nyman .................... 179/100.1 B |
| 4,004,080 | 1/1977 | Vossen, Jr. .................... 179/100.1 B |
| 4,018,945 | 4/1977 | Mehalso .................... 179/100.1 B |
| 4,072,985 | 2/1978 | Kaganowicz .................... 428/64 |
| 4,077,051 | 2/1978 | Vossen, Jr. .................... 428/64 |
| 4,077,052 | 2/1978 | Vossen, Jr. .................... 428/64 |

*Primary Examiner*—Ellis Robinson
*Attorney, Agent, or Firm*—H. Christoffersen; Birgit E. Morris

[57] ABSTRACT

This invention relates to a video disc with a thin polymeric dielectric layer formed from acetylene and nitrogen in a glow discharge. The dielectric layer has improved age deterioration resistance and wear characteristics and can be prepared with low power levels.

10 Claims, 1 Drawing Figure

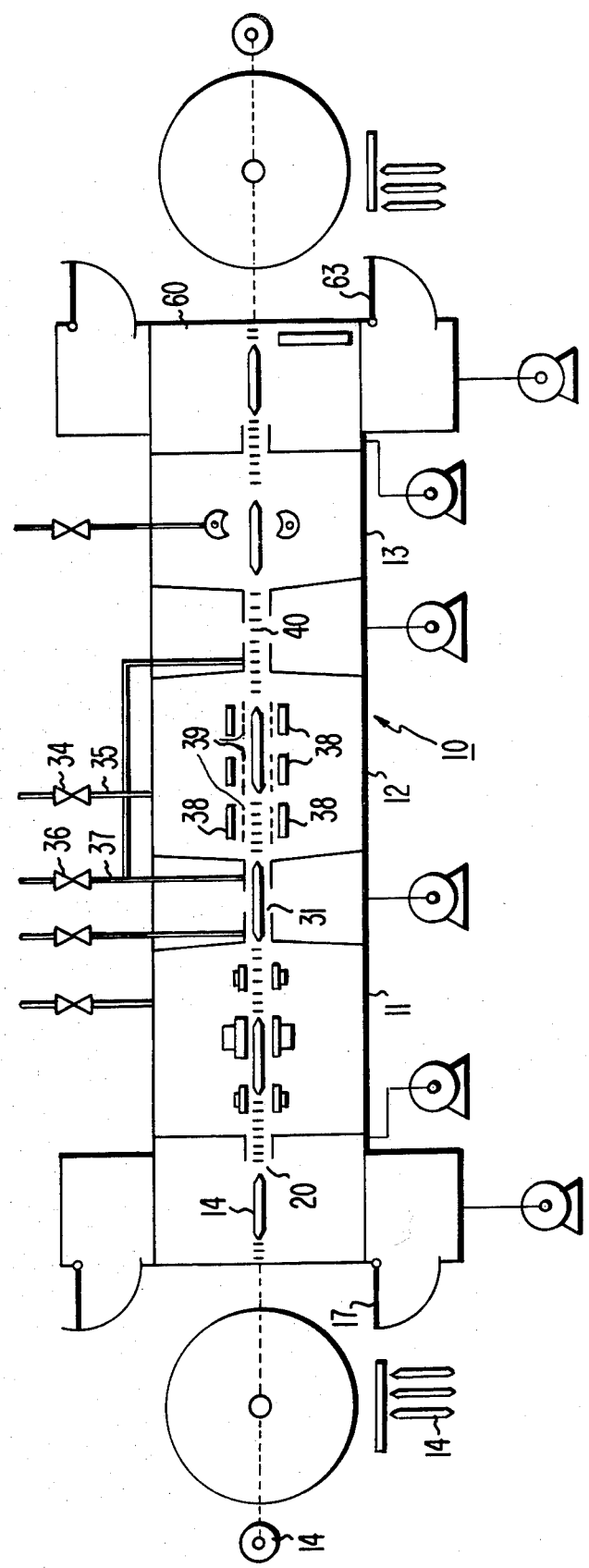

VIDEO DISC WITH A DIELECTRIC LAYER FORMED FROM ACETYLENE AND NITROGEN

REFERENCE TO RELATED APPLICATIONS

This application is related to copending application "A Video Disc with a Dielectric Layer Formed from Styrene and Nitrogen", Ser. No. 793,872 now U.S. Pat. No. 4,072,985, issued Feb. 7, 1978, by G. Kaganowicz and J. W. Robinson; copending application "Method of Depositing a Lubricant Layer on a Video Disc", Ser. No. 793,643, by A. D. Grubb and G. F. Nichols now abandoned; copending application "A Video Disc Capacitive Recording Means With a Conductive Bilayer", Ser. No. 793,644 now U.S. Pat. No. 4,077,052, issued Feb. 28, 1978, by J. L. Vossen; and copending application "A Video Disc With a Conductive Layer Having an Oxygen Content Gradient", Ser. No. 793,640 now U.S. Pat. No. 4,077,051, issued Feb. 28, 1978, by J. L. Vossen, which applications were filed on May 4, 1977 and are herein incorporated by reference.

BACKGROUND OF THE INVENTION

An audio/video information system for recording and playing back audio/video information has been described in U.S. Pat. Nos. 3,842,194 and 3,842,217 to Clemens herein incorporated by reference. According to this system, audio/video information is recorded in the form of geometric variations in spiral grooves on the surface of the disc. Disc replicas are then made of an insulating material such as vinyl and are coated first with a conductive material and then with a dielectric film. A metallized stylus is utilized as a second electrode forming a capacitor with a video disc. The audio/video information is monitored by the stylus which notes changes in capacitance between the stylus and the video disc as the geometric variations in the form of depressions pass under the stylus. The groove density of video discs is generally from about 1,000 to about 10,000 grooves per inch (400–4000 grooves per centimeter).

In the above mentioned copending application to G. Kaganowicz and J. W. Robinson, a polymeric dielectric coating for the video disc is described wherein the polymeric dielectric coating is formed from styrene and nitrogen deposited in a glow discharge. While this dielectric forms a satisfactory coating, it has been desired to have a dielectric coating with improved wear and age deterioration resistance.

SUMMARY OF THE INVENTION

This invention pertains to a capacitive recording means comprised of a disc having a spiral groove on a face thereof with audio/video information in the form of geometric variations in said groove. A thin conductive layer is deposited on the face of the disc followed by a polymeric dielectric layer. It has been found that when the dielectric layer is deposited from nitrogen and acetylene in a glow discharge, the age deterioration resistance and wear characteristics of the video disc are greatly improved. Furthermore, the deposition of dielectric layers using acetylene and nitrogen can be accomplished with low electrical power densities in the flow discharge as compared to the power densities required for depositing dielectric layers from styrene and nitrogen.

BRIEF DESCRIPTION OF THE DRAWING

The FIGURE is a schematic illustration of an apparatus for vacuum depositing in a continuous manner first a conductive layer, then a dielectric layer, and then a lubricant layer on a vinyl disc containing geometrically coded audio/video information.

DETAILED DESCRIPTION OF THE INVENTION

A disc replica containing geometrically coded audio/video information is first prepared in a manner described in the above mentioned Clemens' patents. Suitably the disc material is a vinyl such as polyvinyl chloride. Next, a conductive layer is deposited onto the vinyl discs. Suitably the conductive layer is a bilayer comprised of a first thin copper layer and a second thin layer of nickel/chromium/iron alloy wherein the iron content is less than 10% by weight and the oxygen content is about 5 to about 20 atomic percent. Atomic percent as employed in the specification and in the claims is defined as that measured by Auger electron spectroscopy which is described in more detail in U.S. Pat. No. 3,982,066 to Nyman et al. The deposited copper layer is approximately 25 to 50 angstroms thick and the deposited nickel/chromium/iron alloy layer is about 100 to 400 angstroms thick.

According to the present invention, a polymeric dielectric layer formed from acetylene and nitrogen in a glow discharge is than deposited on the conductive layer. Suitably the deposited polymeric layer is about 50 to 500 angstroms thick. The deposited polymeric layer contains from about 1.5 to about 8 atomic percent of nitrogen and preferably from about 2.5 to about 5 atomic percent of nitrogen.

The amount of acetylene and nitrogen in the deposited layer will depend on the relative amounts of acetylene and nitrogen in the glow discharge plasma. The manner of obtaining sufficient amounts of acetylene and nitrogen in the glow discharge will depend on whether a batch or continuous process is employed. For example, when a batch process is employed for deposition, the chamber containing the disc, such as a conventional vacuum bell jar, is first evacuated to about $10^{-6}$ torr. Before the glow is initiated, nitrogen is introduced to produce a partial pressure of about 5 to 30 microns and acetylene monomer is introduced to produce a total pressure of about 10 to 80 microns, with the partial pressure ratio of nitrogen to acetylene at from about 0.2:1 to about 5:1. When the glow is initiated it contains sufficient nitrogen to produce dielectric layers containing from about 1.5 to about 8 atomic percent of nitrogen. The equilibrium pressure during glow discharge is from about 6 to 60 microns.

When a continuous apparatus is used for depositing the dielectric layer, such as is described in greater detail in the above mentioned copending application to G. Kagonowicz and J. W. Robinson, a glow discharge containing sufficient quantities of acetylene and nitrogen can be obtained by controlling the introduction rate of the acetylene and the nitrogen, and the pressure of the glow discharge. For example, when vinyl discs 30.5 cm in diameter are to be coated at the rate of 720 per hour, the acetylene is introduced at a rate of about 30 to 300 standard cubic centimeters per minute (sccm) and the nitrogen is introduced at a rate of about 50 to 300 sccm. The glow discharge is then activated and maintained at a pressure of about 5 to 15 microns.

After the dielectric layer has been deposited, a lubricant layer can be deposited in accordance with the manner described in the above mentioned copending application to Grubb et al. suitably utilizing methyl alkyl siloxane lubricants having the formula:

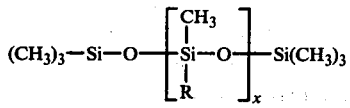

wherein R is an alkyl group of 4–20 carbon atoms and x is an integer. Suitable lubricant layer thicknesses are from about 90 to 400 angstroms and preferably about 200 to 250 angstroms. Since the metal layers, dielectric layer and lubricant layer may be deposited under vacuum conditions in a continuous manner, a single apparatus may be employed for depositing all the layers which allows for rapid processing of the video disc. Alternatively, the methyl alkyl siloxane lubricant can be applied by spinning from solution.

The FIGURE is a cross-sectional top view which schematically illustrates a vacuum chamber 10 which is divided into three connecting evacuated chambers, a metal deposition chamber 11, a dielectric deposition chamber 12, and an oil lubricant deposition chamber 13. Vinyl disc replicas 14 containing geometrically coded audio/video information are transported into the vacuum chamber 10, which is maintained at about 3 to 12 microns during operation via an inlet pressure lock 17. The vinyl discs 14 are loaded singly in a vertical position onto a continuously moving conveyor belt 20. The video discs are first conveyed into the metal deposition chamber 11 where metal layers are sputtered onto both sides of each vinyl disc 14. The vinyl discs 14 are then conveyed through a tunnel 31 into the dielectric deposition chamber 12. In accordance with the present invention a dielectric layer prepared from acetylene and nitrogen is deposited in a glow discharge. The acetylene is added through a valve 34 and a line 35 and the nitrogen is supplied through a valve 36 and a line 37. Both are added as gases. A glow discharge is created by supplying an electrical current to pairs of screen electrodes 39 located in the chamber 12 and positioned on both sides of the vinyl discs 14. Magnets 38 are used to confine the discharge. From 1 to 3 pairs of electrodes may be employed, depending upon the desired rate of deposition and layer thickness. The glow discharge activates the acetylene monomer which copolymerizes with the nitrogen at the surface of the discs 14. Current from about 0.5 to about 3.0 amperes and at a frequency of about 10 kilohertz is supplied to each of the pairs of electrodes 39 at a power of about 300 to about 1,500 watts. The current can be varied to regulate the thickness and the degree of cross-linking of the deposited film and to regulate the heat buildup of the disc, which should not exceed about 130° F. (54° C.). The density of the screen electrodes 39 (open area/total area) regulates the amount of energy available to the acetylene and nitrogen surrounding the vinyl disc and affects the deposition thickness of the dielectric layer. Suitable screen densities are from about 0% (plates) to about 30%.

After the vinyl discs 14 are coated with the dielectric layer they are conveyed into the oil lubricant deposition chamber 13 through a second tunnel 40 and coated with an oil lubricant.

The discs 14 now coated with a metal layer, a dielectric layer, and a lubricant oil layer, are conveyed into a disc collection area 60 where they are removed from the vacuum chamber by way of an outlet pressure lock 63.

The following Examples are presented to further describe the invention but it is not meant to limit the invention to the details described therein.

EXAMPLE

In this Example vinyl disc replicas, each approximately 30.5 cm in diameter and containing geometrically coded audio/video information in a spiral groove (5,555 grooves per inch) were coated with conductive layers, dielectric layers, and lubricant layers utilizing a continuous deposition apparatus as described above. The vinyl discs were coated at a rate of 720 per hour.

The deposited conductive layer was a bilayer consisting of a first copper layer about 50 angstroms thick and then an alloy layer of Inconel-600 (76.8% nickel, 13.8% chromium and 8.5% iron) about 200 angstroms thick.

The deposited polymeric dielectric layer contained about 4.0 atomic percent of nitrogen and the layer was about 115 angstroms thick. In the dielectric chamber the nitrogen was introduced at 95 sccm and produced a partial pressure of 8 microns in the chamber. The glow was activated by supplying 600 watts of electrical power at a frequency of 10 kilohertz to each of three pairs of electrodes for a total power of 1800 watts. The acetylene monomer was then introduced at a rate of 96 sccm and produced a total pressure of 11 microns.

In the lubricant chamber a lubricant was added to the vaporizer at the rate of 6 ml/hr. The lubricant was a silicon compound having a viscosity of about 49.0 centistokes at 25° C. and a specific gravity of 0.89 and having the formula

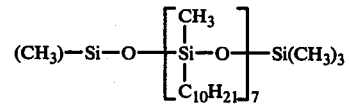

The vaporizer was maintained at a temperature of about 250° C., and the lubricant chamber was maintained at about 5 microns pressure. The deposited lubricant layer was about 220 angstroms thick.

About 50 coated vinyl discs were stored at 90° F. (32° C.) and 50% relative humidity for 1 year and then repeatedly played back by contacting the rotating disc with the stylus as described in the Clemens' patents. After 1000 playbacks all the video discs tested continued to function properly producing audio/visual information.

CONTROL

This Example is presented as a control.

Video discs were prepared as described in Example 1 of the above mentioned copending application to G. Kaganowicz and J. W. Robinson. These discs contained a dielectric layer prepared from styrene and nitrogen. The total power supplied to the electrodes in the dielectric chamber was 3250 watts, as compared to a total power 1800 watts utilized in the Example of this invention.

About 30 video discs were tested in a manner similar to the Example of this invention and it was found that approximately 25% of the control records were worn out after 1000 plays compared with none in the Example of the present invention.

What is claimed is:

1. A capacitive recording means comprising a disc having a spiral groove on a face thereof with audio/v- ideo information in the form of geometric variations in said groove, a thin conductive layer thereon and a thin dielectric layer formed from acetylene and nitrogen in a glow discharge on said conductive layer.

2. A recording means according to claim 1 wherein the dielectric layer contains from about 1.5 to about 8 atomic percent of nitrogen.

3. A recording means according to claim 1 wherein the dielectric layer contains from about 2.5 to about 5 atomic percent of nitrogen.

4. A recording means according to claim 1 wherein the dielectric layer is about 50 to about 500 angstroms thick.

5. A recording means according to claim 1 wherein the conductive layer is a bilayer of a first copper layer and a nickel/chromium/iron alloy layer wherein the iron content is less than 10 percent by weight and the oxygen content is about 5 to about 20 atomic percent.

6. A recording means according to claim 5 wherein the copper layer is from about 25 to 50 angstroms thick and the alloy layer is from about 100 to 400 angstoms thick.

7. A capacitive recording means according to claim 1 wherein the recording means has a lubricant layer on said dielectric layer.

8. A capacitive recording means according to claim 7 wherein the lubricant layer is from about 90 to about 400 angstroms thick.

9. A capacitive recording means according to claim 7 wherein the lubricant layer is from about 200 to about 250 angstroms thick.

10. A capacitive recording means according to claim 7 wherein the lubricant layer is a silicon compound having the formula

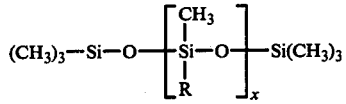

wherein R is an alkyl group of 4–20 carbon atoms and x is an integer.

* * * * *